(12) United States Patent
Garg

(10) Patent No.: US 11,570,112 B2
(45) Date of Patent: Jan. 31, 2023

(54) MAXMESH: MESH BACKHAUL ROUTING

(71) Applicant: Parallel Wireless, Inc., Nashua, NH (US)

(72) Inventor: Sumit Garg, Hudson, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/932,967

(22) Filed: Jul. 20, 2020

(65) Prior Publication Data
US 2020/0351209 A1 Nov. 5, 2020

Related U.S. Application Data

(63) Continuation of application No. 16/168,247, filed on Oct. 23, 2018, now abandoned, which is a (Continued)

(51) Int. Cl.
*H04L 1/00* (2006.01)
*H04L 47/24* (2022.01)
*H04L 47/122* (2022.01)
*H04L 45/00* (2022.01)
*H04W 28/02* (2009.01)
*H04W 84/12* (2009.01)
*H04W 84/18* (2009.01)

(52) U.S. Cl.
CPC ............. *H04L 47/24* (2013.01); *H04L 45/22* (2013.01); *H04L 45/70* (2013.01); *H04L 47/122* (2013.01); *H04W 28/0289* (2013.01); *H04W 84/12* (2013.01); *H04W 84/18* (2013.01)

(58) Field of Classification Search
CPC ......... H04L 47/24; H04L 45/22; H04L 45/70; H04L 47/122; H04W 84/12; H04W 84/18
See application file for complete search history.

(56) References Cited

U.S. PATENT DOCUMENTS 7,773,536 B2 *  8/2010  Lloyd ..................... H04L 47/20
                                                370/252
10,313,225 B1 *  6/2019  Shevade ................. H04L 45/44
(Continued)

*Primary Examiner* — Abdelnabi O Musa
(74) *Attorney, Agent, or Firm* — Michael Y. Saji; David W. Rouille

(57) ABSTRACT

A system is disclosed, comprising: a centralized routing node configured to: identify a set of congested links based on the link utilization statistics, each congested link having at least one traffic flow that may be active, each traffic flow having at least one traffic source and a path set comprising a set of nodes and links that may be used by the traffic flow as packets travel from the at least one traffic source to one or more destinations; identify a set of non-congested links based on the link utilization statistics, each non-congested link sharing at least one traffic source with a traffic flow of a congested link in the set of congested links; identify a path fork in a path set between a source and a destination of a particular traffic flow associated with a particular congested link in the set of congested links; and compute a new utilization level for the particular congested link that would result from moving the particular traffic flow from the particular congested link to a particular non-congested link in the set of non-congested links.

17 Claims, 10 Drawing Sheets

Related U.S. Application Data continuation of application No. 15/132,229, filed on Apr. 18, 2016, now Pat. No. 10,129,158.

(60) Provisional application No. 62/149,435, filed on Apr. 17, 2015.

(56) References Cited

U.S. PATENT DOCUMENTS

| | | | |
|---|---|---|---|
| 2006/0018256 A1* | 1/2006 | Chiu | H04L 45/50 370/229 |
| 2006/0159020 A1* | 7/2006 | Porat | H04L 41/0803 370/235 |
| 2008/0075029 A1* | 3/2008 | Song | H04L 45/16 370/329 |
| 2008/0080440 A1* | 4/2008 | Yarvis | H04B 7/026 370/338 |
| 2008/0225717 A1* | 9/2008 | Chen | H04W 28/02 370/235 |
| 2008/0317047 A1* | 12/2008 | Zeng | H04L 45/00 370/401 |
| 2009/0003211 A1* | 1/2009 | Akyamac | H04J 14/0284 370/235 |
| 2010/0091656 A1* | 4/2010 | Chiu | H04L 47/10 370/237 |
| 2011/0044169 A1* | 2/2011 | Liu | H04W 28/021 370/235 |
| 2015/0023173 A1* | 1/2015 | Sharma | H04L 47/122 370/236 |
| 2015/0109943 A1* | 4/2015 | Sahin | H04W 24/02 370/252 |
| 2016/0135107 A1 | 5/2016 | Hampel et al. | |
| 2016/0234578 A1* | 8/2016 | Sareen | H04L 45/124 |
| 2017/0155580 A1* | 6/2017 | Ramanujan | H04L 45/02 |
| 2017/0237710 A1* | 8/2017 | Mayya | H04L 67/42 726/13 |
| 2018/0302797 A1* | 10/2018 | Mishra | H04W 84/20 |

* cited by examiner

MAXMESH: MESH BACKHAUL ROUTING

CROSS-REFERENCE TO RELATED APPLICATIONS

This application is a continuation of, and claims the benefit of an earlier filing date under 35 U.S.C. § 120 based on, U.S. patent application Ser. No. 16/168,247, filed Oct. 23, 2018, and entitled "MaxMesh: Mesh Backhaul Routing", which is a continuation of, and claims the benefit of an earlier filing date under 35 U.S.C. § 120 based on, U.S. patent application Ser. No. 15/132,229, filed Apr. 18, 2016, and entitled "MaxMesh: Mesh Backhaul Routing", which itself claims the benefit of priority under 35 U.S.C. § 119(e) of U.S. Provisional Patent Application No. 62/149,435, filed on Apr. 17, 2015 and entitled "MaxMesh: Mesh Backhaul Routing," which are each hereby incorporated by reference in their entirety for all purposes. The present application also hereby incorporates by reference U.S. patent application Ser. No. 14/531,996, "Heterogeneous Mesh Network and a Multi-RAT Node Used Therein," filed Nov. 3, 2014; U.S. patent application Ser. No. 14/988,508, "Methods of Incorporating an Ad Hoc Cellular Network into a Fixed Cellular Network," filed Jan. 5, 2016; U.S. patent application Ser. No. 14/777,246, "Methods of Enabling Base Station Functionality in a User Equipment," filed Sep. 15, 2015; U.S. patent application Ser. No. 14/506,587, "Multicast and Broadcast Services Over a Mesh Network," filed Oct. 3, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015, each in its entirety for all purposes.

BACKGROUND

Mesh networks can be extremely dynamic and the resulting changes in network topology make a rapidly reconfigurable wireless backhaul solution necessary. Mesh networks provide certain advantages that are enabled by flexible routing.

Although various metrics are available for providing mesh routing, alternative metrics like ETT and IRU do not seem to have a lot of benefit once MIMO is introduced. Others work well in single radio meshes. Most research has been carried out on 802.11a/b/g networks. Even the metric for 802.11n, like eCOT, require RTS/CTS to be enabled. This like most other link aware metrics which seem to perform better with RTS/CTS but that in itself introduces a big hit on the throughput (RTS/CTS cannot be aggregated and are sent at 6 Mbps for the benefit of 802.11b devices). A planned static network seems to outperform these approaches. In any case 802.11 networks are not meant for highly mobile meshes. For them 802.11p support at the radio and the driver is desirable.

SUMMARY

In one embodiment, a system may be disclosed, comprising: a centralized routing node configured to: receive link utilization statistics from a mesh network node; identify a set of congested links based on the link utilization statistics, each congested link having at least one traffic flow that may be active, each traffic flow having at least one traffic source and a path set comprising a set of nodes and links that may be used by the traffic flow as packets travel from the at least one traffic source to one or more destinations; identify a set of non-congested links based on the link utilization statistics, each non-congested link sharing at least one traffic source with a traffic flow of a congested link in the set of congested links; identify a path fork in a path set between a source and a destination of a particular traffic flow associated with a particular congested link in the set of congested links; compute a new utilization level for the particular congested link that would result from moving the particular traffic flow from the particular congested link to a particular non-congested link in the set of non-congested links; and send a new route to the mesh network node to move the particular traffic flow from the particular congested link to the particular non-congested link.

The centralized routing node may be further configured to compute a new utilization level for the particular non-congested link that would result from moving the particular traffic flow from the particular congested link to the particular non-congested link. A plurality of mesh network nodes may be each with eNodeB functionality and Wi-Fi mesh networking functionality. A plurality of in-vehicle mobile mesh network nodes may be provided. The centralized routing node may be further configured to limit a rate of route changes propagated to the mesh network node to within a maximum threshold. A plurality of mesh network nodes utilizing a mesh network protocol for providing mesh network routes with lower priority than routes received from the centralized routing node may be provided. The mesh network protocol may be the Babel protocol using an expected transmission count (ETX) metric, or may be any other mesh network protocol that ensures correct routing. The plurality of mesh network nodes may be configured to fail over to the lower priority mesh network routes when a link failure occurs on a route received from the centralized routing node. The centralized routing node may be configured to compute default routes by iterating over: a set of mesh nodes, a set of mesh node interfaces, a set of congested links, a set of non-congested links, or a set of path forks for a particular traffic flow path. The link utilization statistics include at least one of a channel clear count, an antenna cycle count, an inter-frame spacing, a packet count, a link modulation and coding scheme, and a measured link data rate. For a contention-based protocol such as Wi-Fi, the channel can be used for only a fraction of the time, and cannot be used when the channel is in use by another transmitter or during the designated inter-frame period. Measuring when the channel is clear can be used to determine whether a given channel is overloaded or congested. The centralized routing node may be configured to identify the set of congested links based on: a preconfigured traffic estimate; a network routing table connection tracking method; a packet count derived from a particular network interface on a mesh node; or statistics derived from a Internet Protocol Security (IPsec) module.

In another embodiment, a method may be disclosed, comprising: initializing a mesh network node with an Internet Protocol (IP) address; identifying a first mesh network route from the mesh network node to another node using a mesh routing protocol; sending, from the mesh network node to a coordinating node, link characterizing information for the mesh network route; receiving, from the coordinating node, a second mesh network route; installing, at the mesh network node, the mesh network route as a default route; and responding to a network failure by uninstalling the second mesh network route and reverting to the first mesh network route.

The mesh network node may have eNodeB functionality and Wi-Fi mesh networking functionality. The method may further comprise utilizing a mesh network protocol for providing mesh network routes with lower priority than routes received from the coordinating node. The mesh network protocol may be the Babel protocol using an expected transmission count (ETX) metric.

DETAILED DESCRIPTION

Figure 1:
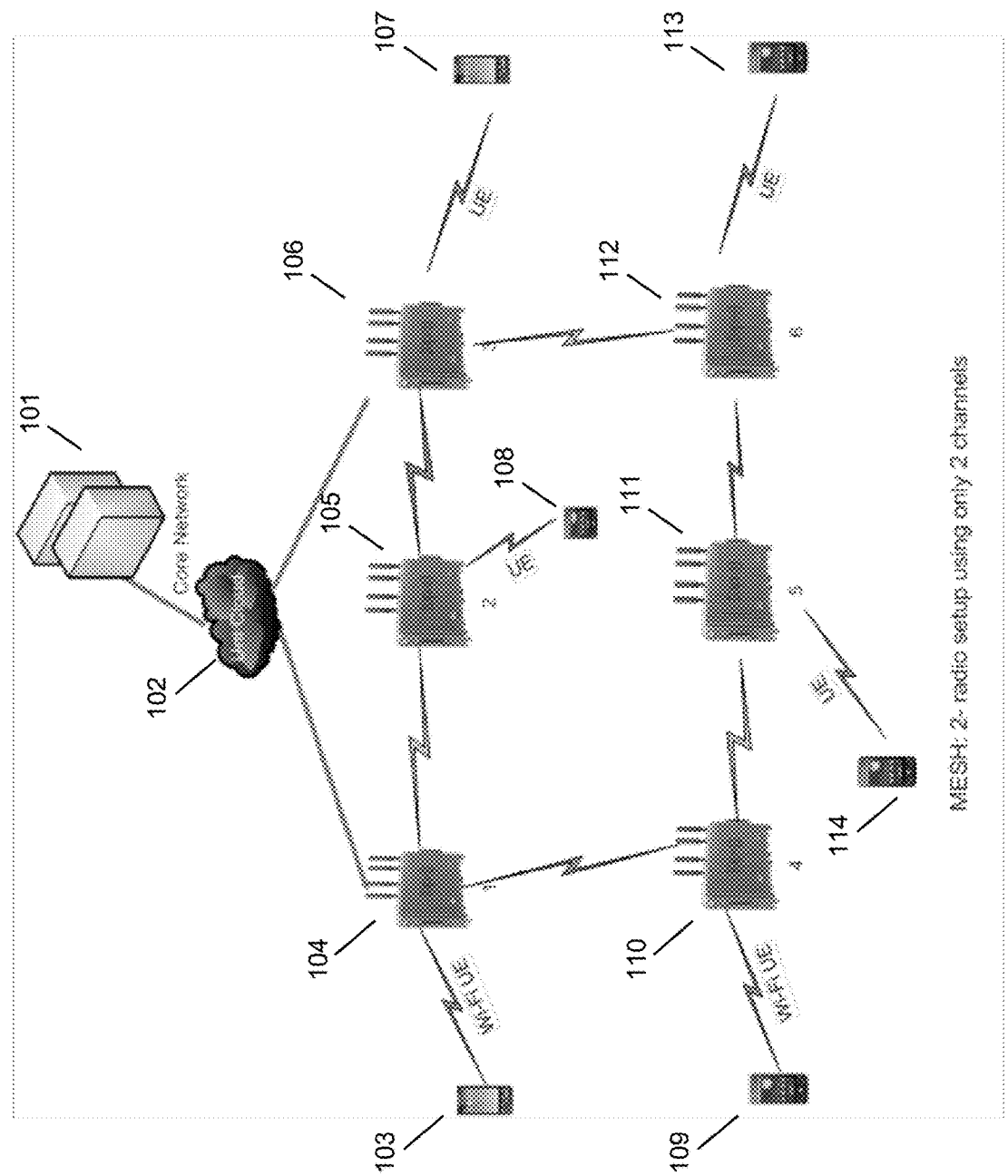
FIG. 1 is a schematic diagram of a mesh network with flexible routing, in accordance with some embodiments.

FIG. 1 depicts a typical deployment scenario for a wireless mesh base station in the operator network. A mesh node could be functioning in either a gateway mode, with access to an inter-connect network though which it establishes connectivity to the cloud, which could either be wired or wireless (e.g. LTE), or a mesh mode, in which the mesh node has no direct connection to the core or infrastructure provider network, with its only means of connecting to the network being over mesh-links. Establishment of the mesh network is covered in other documents, such as U.S. patent application Ser. No. 14/183,176, which is hereby incorporated herein in its entirety for all purposes. Additionally, IETF RFC6126, detailing the Babel routing protocol, is hereby incorporated herein in its entirety for all purposes. Additionally, IETF RFC3456, detailing DHCP configuration of IPsec tunnel mode, is also hereby incorporated herein in its entirety for all purposes. Also incorporated by reference: M. Boutier and J Chroboczek. Source-Specific routing. To appear in IFIP Networking 2015, describing the Babel protocol, and B. Jonglez, M. Boutier and J. Chroboczek. Delay-based routing. Submitted for publication, 2015, describing the ETX metric, each incorporated by reference in their entirety for all purposes.

FIG. 1 is a schematic diagram of a mesh network with flexible routing, in accordance with some embodiments. A mesh network is shown with mesh nodes 104, 105, 106, 110, 111, and 112. Each mesh node may be equipped with one or more wireless interfaces. For example, each mesh node is equipped with a wireless interface for communicating with other mesh nodes. Each shown mesh node has a wireless connection with two other mesh nodes, and has a choice of which mesh node to use for routing packets. Mesh node 104 is using a Wi-Fi interface to be in communication with mobile device 103, which is a Wi-Fi user equipment (UE). Mesh node 110 is also using Wi-Fi to communicate with a Wi-Fi UE. Mesh node 105 is in communication with UE 108 via a 3G or 4G connection. Mesh node 106 is in communication with UE 107 via a 3G or 4G connection. Mesh node 111 is in communication with UE 114 via a 3G or 4G connection. Mesh node 112 is in communication with UE 113 via a 3G or 4G connection. In the configuration shown, all traffic from UEs 103, 109, 107, 113, 114 go through either mesh node 104 or 106, which have wired connections to gateway 102. Gateway 102 is connected to core network 101, which is an operator core network providing, e.g., 3G or 4G services such as authentication, packet service, voice call service, or other services. This setup is possible with, for example, each mesh node having one 3G or 4G radio transceiver and one Wi-Fi transceiver. The network as shown is highly resilient, as a mesh link may go down without affecting the ability to backhaul traffic out through gateway 102 to core network 101. Gateway 102 may be a routing coordination server in some embodiments.

Where the term mesh node or mesh base station is used herein, it is understood to interchangeably mean a mesh node, a base station, a wireless access point, or a combination thereof, as these functionalities may be added to each of the mesh nodes with the addition of appropriate hardware and software. The mesh nodes may have wired and wireless link capabilities, in some embodiments, and may use these in concert to perform routing. The mesh nodes may have routing capabilities, including routing tables, and may have the ability to share routes with other network nodes using a mesh routing protocol.

In some embodiments, a new mesh protocol is detailed such that any node at a given point can make use of one default route at a time, and a mesh network such as the ETX metric on Babel may be used to determine priority between the routes. A two-layer mesh is described wherein a first layer, with a mesh routing layer using a standard mesh routing protocol, enables a dynamic network based on a link-aware metric. A second layer operates as a rapidly deployed static network that is an overlay network on top of the underlying mesh. This is enabled by a coordinating node. In some embodiments a single default route implemented as a higher-priority route at each mesh node may be sufficient to provide greater performance.

The approach taken here considers a rapidly deployed static network. The current route convergence algorithm would provide fast connectivity and a fallback mechanism. It also allows a toggle to disable if the feature does more harm than good. Based on all available data a cloud controller can make a decision to traffic shape the network. This would allow us to tweak the algorithm rather then keep on changing the metric to be used. The solution described herein handles the following issues: poor capacity utilization, multiple gateways; poor capacity utilization, multiple gateway interfaces; routing metric bias; IPSec overhead over mesh; redundant (backup) routes; load balancing; and ToS-based routing.

Figure 2:
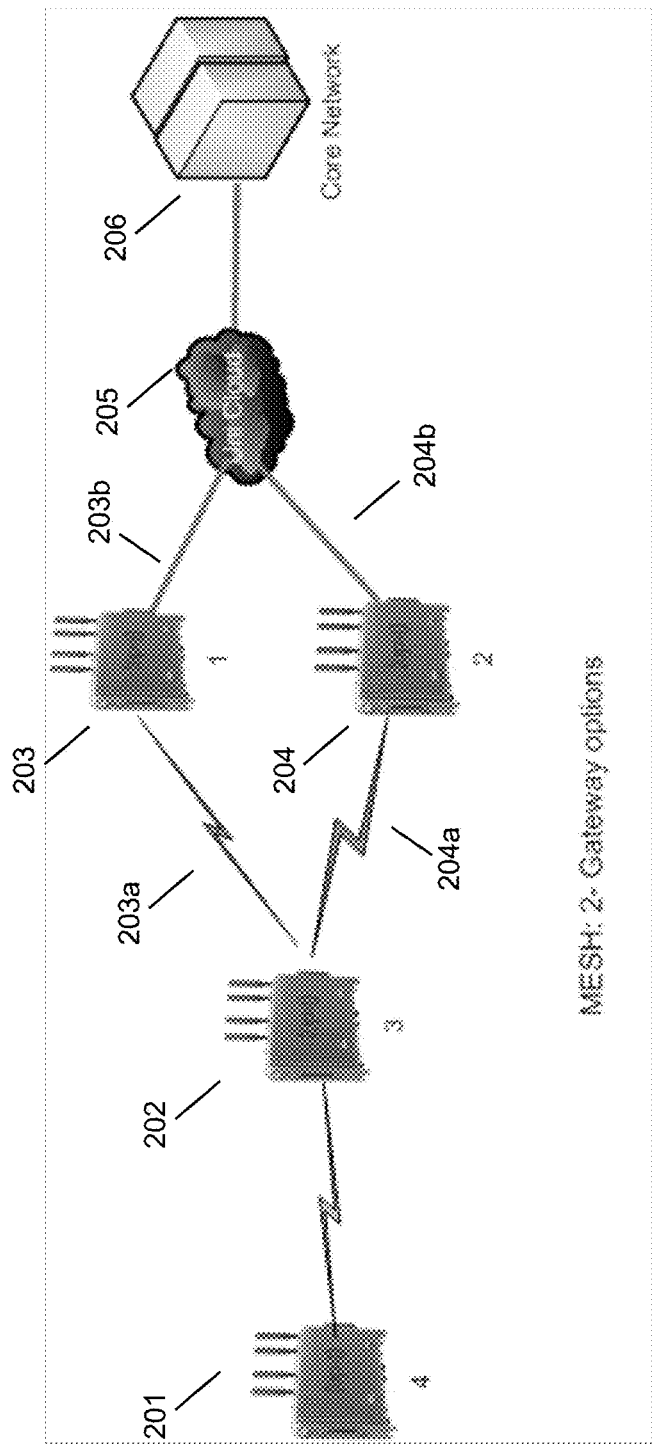
FIG. 2 is a schematic diagram of a mesh network with two gateway options, in accordance with some embodiments.

FIG. 2 is a schematic diagram of a mesh network with two gateway options, in accordance with some embodiments. Mesh node 201 is connected only to mesh node 202. Mesh node 202 is connected to mesh node 201, and also to mesh node 203 via wireless interface 203a and mesh node 204 via wireless interface 204a. Mesh node 203 is also connected to cloud coordination server 205 via wireless interface 203b, and is thus able to serve as a gateway for mesh nodes 201 and 202. Mesh node 204 is also connected to cloud coordination server 205 via wireless interface 204b, and is thus able to serve as a gateway for mesh nodes 201 and 202. Cloud coordination server 205 serves as a gateway for core network 206. UEs attached to each of the mesh nodes are not shown. In some embodiments, cloud coordination server 205 may not be a gateway but may be reachable by the network.

In operation, mesh base station 202 is able to choose one of network routes 203a-203b or 204a-204b for connecting to the core network. Depending on the routing configuration at mesh node 202, traffic from mesh nodes 201 and 202 may be routed solely over link 203a, solely over link 204a, or over both link 203a and link 204a. The link speed of link 203a or link 204a may not be able to support all the traffic resulting from base stations 201, 202, and 203 in the case that traffic is directed through the single link 203b, or base stations 201, 202, and 204 in the case that traffic is directed through the single link 204b.

Consider the network in FIG. 2. Both node 203 and node 204 are gateway nodes with approximately 10 Mbps pipes to the network over LTE. Node 202 is connected to both the nodes over the mesh. Node 201 only gets connectivity via node 202. Let us assume each of the nodes contributes to 4 Mbps in traffic. In the prior art, a single gateway node would end up having 6 Mbps of spare capacity and the other being congested with poor performance with the load on it being approximately 12 Mbps.

In a simplistic solution, a source-based routing decision forcing the traffic for node 201 on gateway 203 and the traffic for node 202 on gateway 204 would alleviate this issue. Of course the assumption is that the overhead in the collision domain for both the links does not end up being the worse bottleneck. In this scenario, the entire traffic would revert to today's flow only in corner cases.

Figure 3:
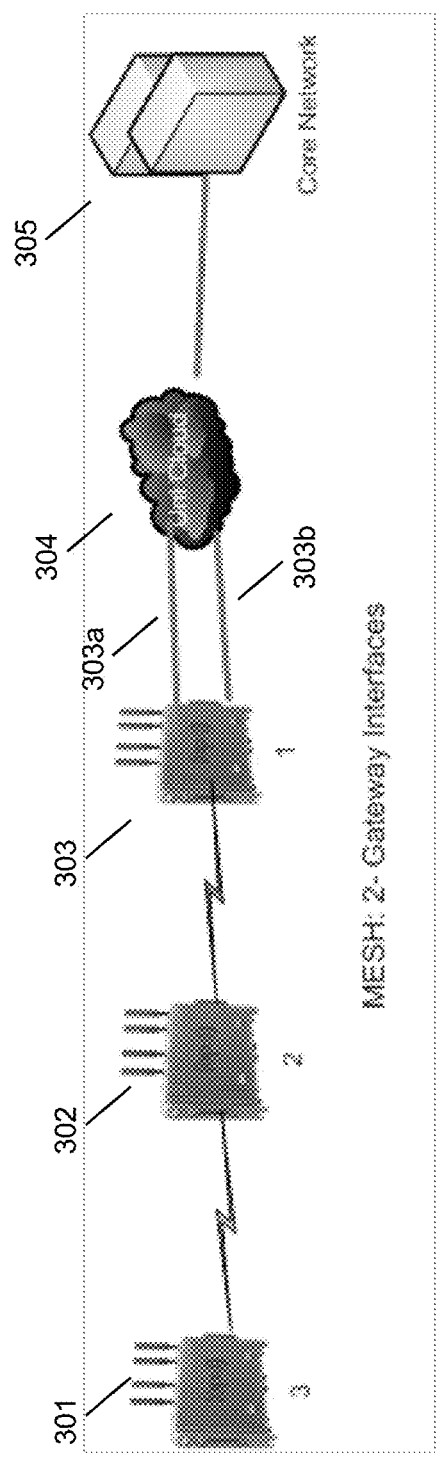
FIG. 3 is a schematic diagram of a mesh network with two gateway interfaces, in accordance with some embodiments.

FIG. 3 is a schematic diagram of a mesh network with two gateway interfaces, in accordance with some embodiments. Mesh node 301 is connected only to mesh node 302 via a wireless mesh link. Mesh node 302 is connected to mesh node 301, and also to mesh node 303 via a wireless mesh link. Mesh node 303 is connected to cloud coordination server 304 via network links 303a and 303b, which may be wired backhaul links. Cloud coordination server 305 acts as a gateway connecting mesh nodes 301, 302, and 303 with core network 305.

In operation, mesh base station 303 has a choice of network links 303a and 303b for sending data to cloud coordination server 304 or core network 305. Based on the routing configuration of mesh base station 303, traffic from mesh nodes 301 and 302 may be routed solely over link 303a, solely over link 303b, or over both link 303a and link 303b. The link speed of link 303a or link 303b may not be able to support all the traffic resulting from base stations 301, 302, and 303 in the case that traffic is directed through a single link.

In FIG. 3, node 303 is the only gateway node in the network. Each of the three nodes generates 4 Mbps of traffic on its own. The two gateway links 303a and 303b can each support 5 and 10 Mbps of traffic respectively. In the prior art, all traffic would stay on 1 of those links, without any guarantee which link the traffic would be sent to.

Again a simplistic source based routing decision forcing the traffic for node 302 and node 301 on one link and the traffic for node 303 on the other would alleviate this issue. In this scenario, the entire traffic would revert to today's flow only in corner cases.

The traffic class and the link reliability could play a role in this as well

Alternatively, iptables could be used as defined in https://home.regit.org/netfilter-en/links-load-balancing/, hereby incorporated herein in its entirety for all purposes, especially in the case of a reduced amount of tunneling in the architecture.

Figure 4:
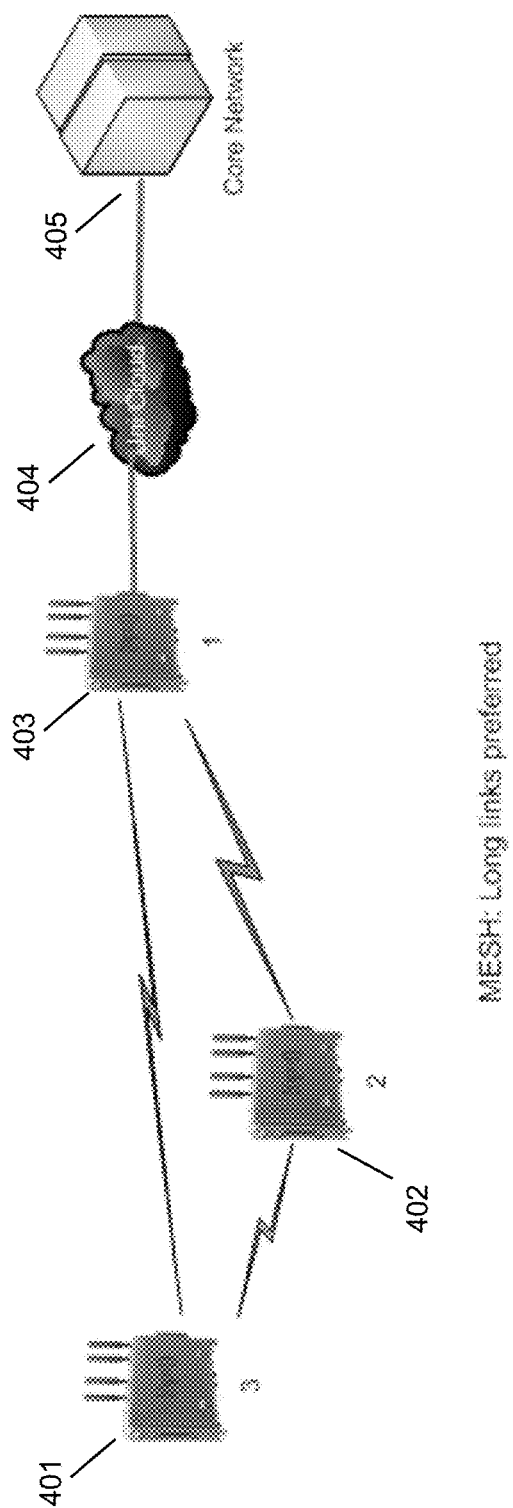
FIG. 4 is a schematic diagram of a mesh network with long links, in accordance with some embodiments.

FIG. 4 is a schematic diagram of a mesh network with long links, in accordance with some embodiments. Mesh node 401 is connected via a short wireless link to mesh node 402, and via a long wireless link to mesh node 403. Mesh node 402 may be connected via short wireless links to mesh nodes 401 and 403. Mesh node 403 may act as a gateway to cloud coordination server 404, which may act as a gateway to core network 405. In operation, a mesh routing protocol may treat the long wireless link between mesh nodes 401 and 403 preferentially, as the use of this link may reduce latency, number of hops, or other factors that result in delay. The mesh routing protocol may use the long link as a default route.

Consider the Network in FIG. 4. In the prior art, Node 3 would give preference to the direct link to Gateway Node 1 which might be a low capacity link due to the long distance and poor RSSI/MCS. The route via node 2 has 2 high capacity links as the intermediate hop does wonders for the RSSI and MCS values. However, the traffic would traverse node 2 only when the direct link becomes extremely choppy and would revert to the direct link as soon as the traffic moved as the link metric would improve.

In this case, some level of routing metric bias is required as Node 2 has to add its own traffic to the mix too. We may estimate the bandwidth available at various links and eventually the routes to make better routing decisions. There are other metrics like IRU, ETT etc. which do better than ETX. However, RTS/CTS is required to be enabled for the benefit. That by itself is a significant cost. Instead, the proposal is to use the available data at the cloud/radio access network regarding the MCS, RSSI and SINR to estimate the link capacity. There was no evidence to suggest that implementing a bandwidth estimator would achieve better results.

In the current scenario, as a side benefit, the traffic going through node 2 actually would improve the bandwidth available between Node 1 and 2 due to the reduced probability of collision and hence the improved channel availability. As we are operating in a CSMA/CD domain, we need to accurately compute the impact of moving traffic to 1 link, on the other links which would be impacted. In general this is one of the bigger problems to tackle.

In general, this is addressed by forming cliques of related links which impact each other in the collision domain. In the most simplistic case we could use the stats from the Atheros driver regarding channel availability from the antenna perspective. It may benefit from additional compensation for inter-framing spacing which is treated as idle time, and some head-room. There are better metrics available in the 802.11k spec. but our chip/driver does not seem to support them. Also, we could in the future try to use the NAV at the driver level to do a secondary estimate on channel-availability.

In some embodiments, IPsec overhead over the mesh may be alleviated using the described routing approach. A 300 Mbps wifi-backhaul can only provide appx 100 Mbps of L3 throughput under good radio conditions. A 20-30% IPsec overhead (400 byte packets are closer to internet average+ IPsec control traffic) is not especially ideal in scenarios where the mesh capacity is the bottleneck.

The advantage of the current solution is the distributed nature of IPsec processing. If we move it all to gateway nodes, the impact has to be quantified. If we do not directly add cloud to the mesh, the cloud routing controller may update the relevant gateway nodes which would then update the TSELs to indicate the update to network topology. We could filter out all traffic towards the cloud routing controller which is not in a tunnel.

In some embodiments, redundant routes may be used to allow one WAN interface as a backup interface. For mesh routes, the route convergence is fast enough. Each WAN interface could be defined as a backup for the other at a different metric. Another solution might be to notify the cloud routing controller about loss of 1 WAN and let it decide.

In some embodiments, load balancing may be enabled between routes. In Linux, there is an allowance to load-balance between routes. However, by default the way Linux does load-balancing is based on the quanta of routes and not the amount of traffic. An earlier and simplistic approach which allowed the traffic to be equally shared between routes (load-based) has been deprecated as it does not serve any useful purpose. Any successful load-balancing implementation has to allow for all traffic belonging to a particular session to flow thru the same path, as far as possible to allow for all stream based traffic to have similar latency and minimum retransmissions, this might be difficult in an extremely tunneled network as ours. As we are carving traffic for best mesh utilization, load balancing should not be necessary.

In some embodiments, type of service may be used for routing. This merely requires the routing calculation to take type of service (ToS) or quality of service (QoS) into account. Babel may be extended to run at different TOS levels to estimate link quality for each. The routing algorithms would become accordingly more complicated at the routing node.

Based on the above, some embodiments may also handle the following issues: estimation of Channel utilization and available band-width on the channel in a collision domain; estimation of traffic sourced from a node for traffic shaping; and overall network latency and reliability.

In some embodiments, a mesh node may collect the following data. Regarding channel utilization: Radio profile: number of received num mgmt packets; Antenna profile: number of switched default/rx antenna; channel clear count (i.e., AR_REG_RX_CLR_CNT); cycle count (i.e., AR_REG_CYCLE_CNT); inter-frame spacing; packet count; and other information as required to obtain channel availability numbers.

In some embodiments, link utilization statistics may be collected. The driver may internally maintain transmit and receive a modulation control scheme (MCS) and rates per link. Some of these are exposed to the higher layers. The Tx and Rx rate are a close approximation of the max capacity achievable on the link under the currently utilized MCS. We could use the same with some additional smoothing over time for capacity estimation.

To do traffic shaping, a fair estimate of the traffic generated per flow is required. As many traffic flows may be heavily tunneled (except for the LAN flows which are NATed), in some embodiments classification may be performed based on source IP address. This estimate can be done in various ways, e.g.:

Static/configured estimate. In an initial RF planning phase some estimates on the traffic being sourced from nodes may be determined to determine the number of gateways required in the network.

Iptables/conntrack based estimate. In some embodiments, an estimate of traffic may be determined based on Iptables, connection tracking, or caches thereof.

Aggregation from interfaces. We could alternatively calculate the traffic being generated by the node by getting the stats from the LAN and BBP interfaces.

IPsec statistics. In some embodiments, traffic statistics could be obtained for each IPsec tunnel at an appropriate interval. As the stats get reset after every rekeying, statistics may be collected before reset.

Iftop-like module. A module like iftop (GPL) could be used to measure per IP flows. Either static values OR use aggregation from interfaces with some headroom could be used for the GPP traffic.

In some embodiments, all the routing data is already made available to the routing coordination server. A mechanism may be implemented to install the more granular routes learned from the cloud routing controller as the primary routes. These source-based routes may be used as the primary routes and may get purged whenever the parent candidate route gets purged. In this scenario the routes would fall back to the defaults as now, until a new update is received from the cloud routing controller. A second level of traffic shaping network routes and/or implementation of ToS based routes may also be contemplated.

Figure 5:
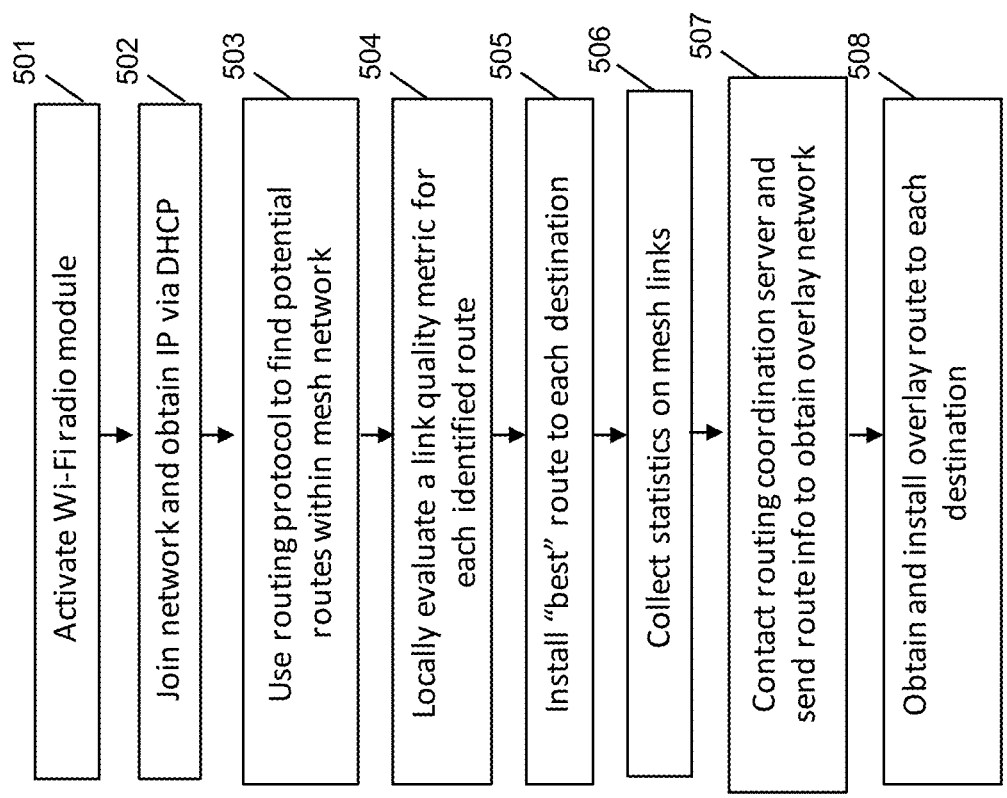
FIG. 5 is a flowchart of a mesh network node activation, in accordance with some embodiments.

FIG. 5 is a flowchart of a mesh network node activation, in accordance with some embodiments. The steps shown are steps that relate to activation of a mesh node in a wireless mesh network. At step 501, a mesh node may be activated and initialized. The step may include activation of a Wi-Fi radio module for connecting with other wireless mesh nodes. At step 502, the mesh node may connect to an Internet Protocol (IP)-based network and obtain an IP address with a dynamic host configuration protocol (DHCP) client interacting with a DHCP server. Once the mesh node acquires an IP address, it is able to discover other mesh nodes and to join the mesh network. At step 503, the mesh node may use a mesh routing protocol to find potential routes within the mesh network. The mesh routing protocol may be the Babel protocol, as described in IETF RFC 6126, "The Babel Routing Protocol," hereby incorporated herein in its entirety. The mesh routing protocol has the property that it enables a mesh network node to discover routes to different networks, and that the discovered routes will not have cycles or other problems. The mesh routing protocol may also enable the mesh node to use information discovered by or obtained from other nodes in the network. After utilizing the mesh routing protocol, the mesh node has a relatively complete list of routes for the network.

At step 504, the mesh node may locally establish a link quality metric for each identified route and for each destination. The link quality metric may be an expected transmission count (ETX) metric, or another metric. The link quality metric may take various factors into consideration, including channel utilization information such as: channel clear count; antenna cycle count; management packet count; inter-frame spacing; total packet count; and the like. The link quality metric may also take into account number of hops, or distance, or latency, or any other parameter as appropriate for a mesh network. The routes may then be sorted in order from best to worst. At step 505, the "best" route to each destination may be installed in a routing table. Other routes may also be installed into the routing table in order, thereby enabling the mesh node to communicate with other nodes and other destinations on the network. The mesh node may then begin to use the routes.

At step 506, the mesh node may collect statistics on the various mesh links, including the information identified above. The mesh node may collect link utilization statistics, in some embodiments, including transmit (TX) and receive (RX) rates per link and the modulation and coding scheme (MCS) for each link. Each mesh link may typically have a maximum throughput, which may be assessed using the TX/RX rates. Channel utilization may be tracked to enable assessment of overhead required when using a particular link, and this overhead may be taken into account in combination with the throughput of a given link. At this point the mesh node has detailed information about each link.

At step 507, the mesh node may send the collected route information to a routing coordination server. The routing coordination server may be located at the edge of the network, at a macro base station, or at a remote location, such as in an operator core network or on the public Internet. A secure tunnel may be used to communicate with the routing coordination server. Alternatively, in some embodiments, the routing coordination may be performed at a particular mesh node, and all nodes in the mesh may send all routing information to that particular mesh node. The routing coordination server may be used to perform central planning of the routes on the network, taking into account information gathered from several mesh nodes, not just from a single mesh node, and also taking into account any manually-configured information. The routing coordination server may be given a sufficient amount of time to allow any calculations of routing to converge, such that when the routing coordination server is done calculating routes, the routes that are sent out actually improve performance.

At step 508 this calculated route information is sent to one or more mesh nodes and is installed at each mesh node. As these calculated routes are understood to perform better than the routes identified by the mesh nodes on their own, they may be installed preferentially over the previously-identified mesh nodes. In some embodiments, a single route may be installed as a default route from the calculated route information. As the calculated route information is added to the earlier-identified route information, it can be understood to be an "overlay" network, that is, a network that exists at the same time as the preexisting mesh network.

The following is the functionality to be implemented on the routing coordination server, in some embodiments.

A configuration manager module may be provided. A command-line interface may show source-based granular routes and traffic flows. We will have a configured value for the capacity of the WAN links.

A mesh manager module may be provided for mesh management. All the routing and other mesh information updates would be made available to this module. This module would make decisions based on the available information to maximize the throughput of the mesh.

A route determination algorithm may be provided, as follows.

This algorithm may use an incremental improvement approach and will not try to make too many improvements in 1 cycle. We will need to define the following parameters:
1. the maximum number of changes to be applied at one time internal for development
2. The ideal load-factor of the WAN links.
3. Ideal Channel-busy factor for mesh links→Internal for development 3.2.2.1.1 Phase 1: Create candidate paths and organize the data
1. Iterate through the route-sets provided by the mesh nodes to create a set of candidate gateway paths to each of the mesh node IP addresses.
2. Mark the currently active paths based on all available data and previous updates from the cloud routing controller.
3. For each of the links in the path associate the current link utilization, max link band-width, channel-availability/utilization stats.
4. Form cliques based on channel utilization on a per link basis; change of load to any one link in the clique would impact all the other links. This would in general be derived from the neighbors visible on a per link basis. For each of these links associate the dependent links in the clique.

3.2.2.1.2 Phase 2: Optimize the WAN interfaces
1. Iterate through the list of mesh nodes to identify the WAN interfaces which might be overloaded if max number of changes not exceeded.
2. Pick an interface which needs to be decongested.
3. Iterate through the list of mesh nodes to identify the WAN interfaces which might easily take additional load and have at least 1 common source in the candidate path-sets.
4. Organize the result-set from 3 in order of decreasing traffic generated.
  a. Pick the 1st source in the set.
  b. For this source:
  i. Traverse the path to the first possible fork to the 2 destinations
  ii. For this fork
  Compute the impact of moving the traffic from the link towards the donor node to the link towards the donee node:
  Whether the target link can handle the additional load.
  Whether the move would keep the channel utilization level acceptable.
  iii. If yes, then make the transition and send routing update request to the mesh node, goto 1.
  iv. If no, find the next fork and goto ii)
  v. If no more forks possible, then pick the next source and goto b.
  vi. If no more sources then c.
  c. Pick the next WAN interface which could be decongested and goto 3.

Figure 6:
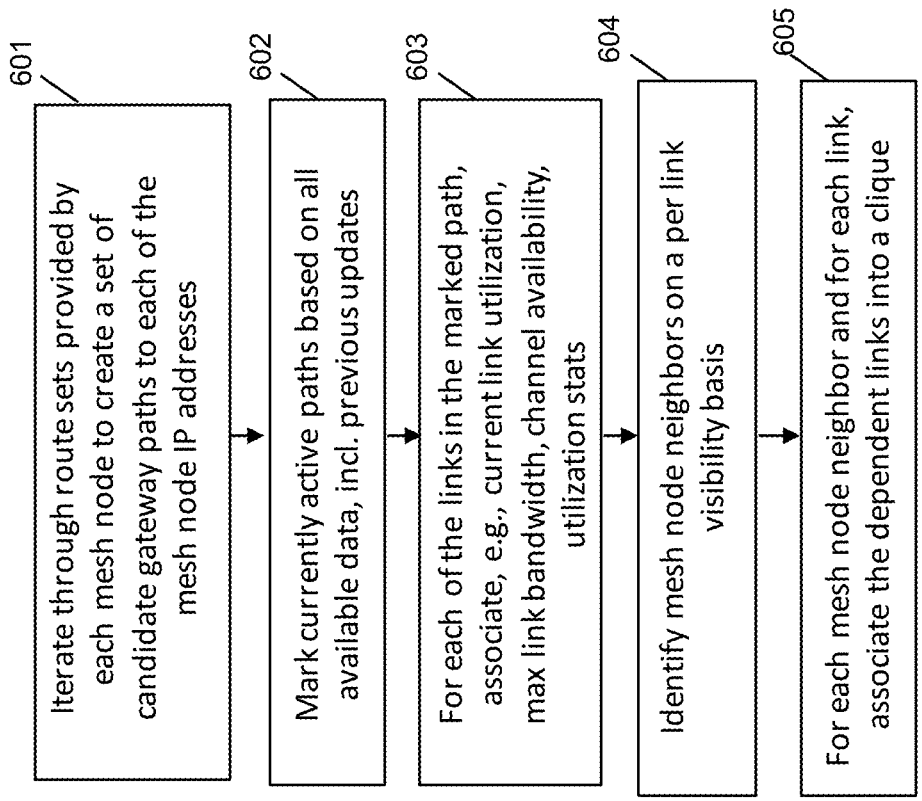
FIG. 6 is a flowchart of a first method performed at a routing coordination node, in accordance with some embodiments.

FIG. 6 is a flowchart of a first method performed at a routing coordination node, in accordance with some embodiments. The routing coordination node receives information from each mesh node and performs steps to determine improved routes. The steps in FIG. 6 may be combined with the steps in FIG. 7, in some embodiments. At step 601, the routing coordination node may iterate through route sets provided by each mesh node. A route set is understood to be a set of routes, in some embodiments. Iterating through the route sets may result in identification of a set of candidate gateway paths to each mesh node, in some embodiments. In some embodiments, a set of default routes for each mesh node may be identified, in some embodiments. In some embodiments, route sets may be communicated via an XML-based format, or via an X2 protocol, or via a binary protocol. In some embodiments, route sets may be all possible routes for a particular destination.

At step 602, the routing coordination node may mark currently active paths based on information from the mesh nodes. For example, if a mesh node indicates that there is an active traffic flow from a source to a destination, the route for that traffic flow may be an active path. Non-active paths may be pruned, so that the routing coordination node calculates routes for paths that are in use first and not for paths that are not in use. A path may include multiple links. For example, with reference to FIG. 4, a first path from mesh node 401 to cloud server 404 may be the links that go through mesh nodes 401 and 403, and a second path may be the links that go through mesh nodes 401, 402, and 403.

At step 603, for each of the links in the marked path, the routing coordination node may associate various information with the links. For example, current link utilization, maximum and minimum link bandwidth, channel availability, channel utilization, and other information may be associated on a per-link basis. At step 604, mesh node neighbors may be identified on a per-link visibility basis. At step 605, for each mesh node neighbor and for each link, the links that relate to each other with dependency may be associated into a clique. A clique is a set of links such that a change of load to any one link in the clique would impact all the other links. Per-link visibility is used in order to identify which links relate to each other in this fashion. When making a change to a route, we examine only the other routes in the clique before making the change. Operation continues according to the steps shown in FIG. 7, in some embodiments.

Figure 7:
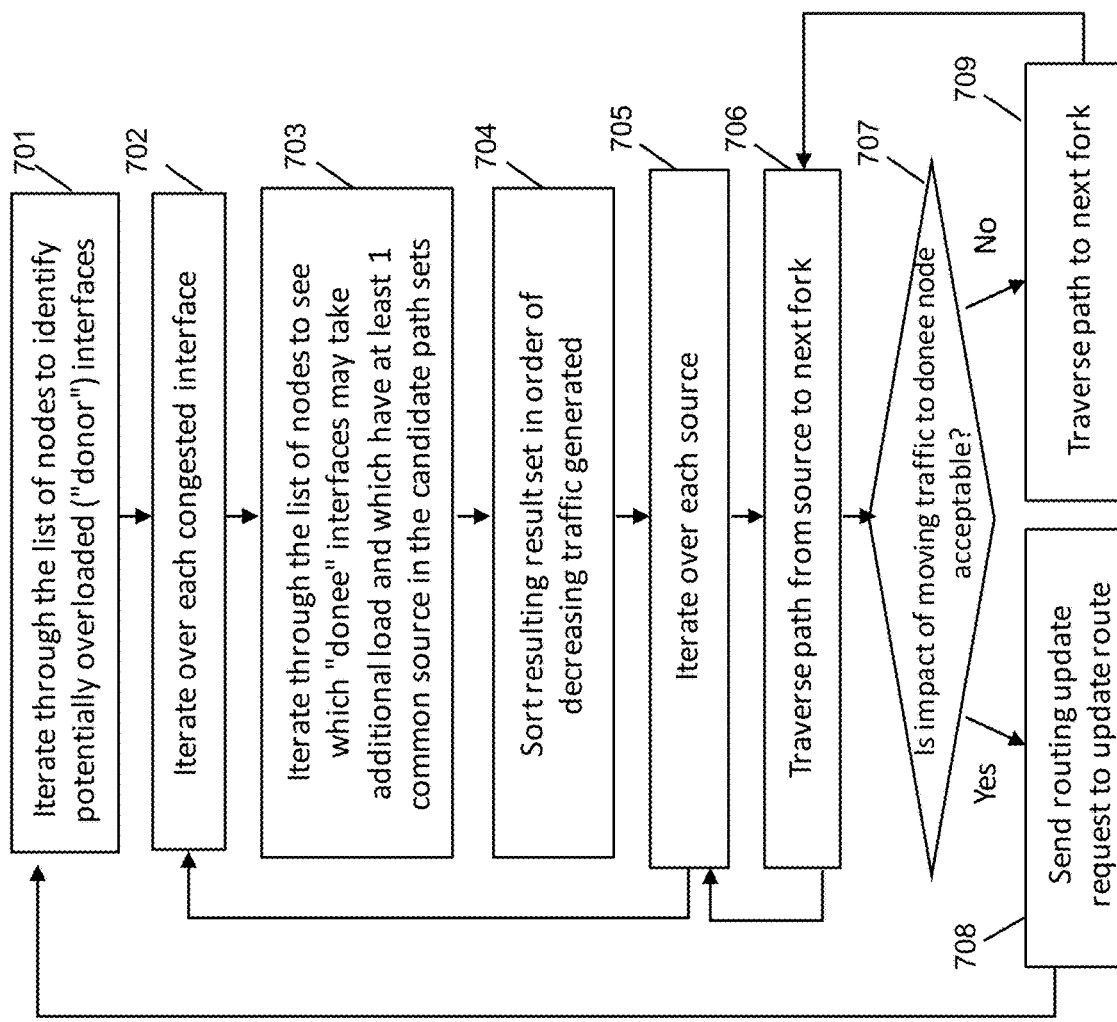
FIG. 7 is a flowchart of a second method performed at a routing coordination node, in accordance with some embodiments.

FIG. 7 is a flowchart of a second method performed at a routing coordination node, in accordance with some embodiments. At step 701, the routing coordination node may iterate through the list of mesh nodes to identify potentially overloaded interfaces, which may be understood as "donor" interfaces as traffic flows will be shifted from them to other interfaces. At step 702, the routing coordination node may iterate over each congested interface in an identified mesh node. It is noted that making too many routing changes at a single time can potentially destabilize a mesh network. Therefore, iteration as shown in FIG. 7 may be stopped at a threshold after a certain number of route changes is performed, and a delay may be used to enable the mesh to stabilize before performing additional iterations.

At step 703, the routing coordination node may iterate through the list of nodes to see which interfaces may take additional load. These interfaces may be known as "donee" interface. An interface may be a donee interface if, for all packet flows handled by that interface, at least one packet flow has a common source as the source of the candidate packet flow. Equivalently, at least one packet flow may have a common source as at least one path set in the set of path sets associated with the donor interface (known as candidate path sets).

At step 704, the result of step 703 may be sorted in order of decreasing traffic generated, such that the improvement in routes will be significant. At step 705, each traffic source may be handled in turn. At step 706, for each traffic source, the path of the traffic flow may be traced one step at a time. If only one path is available for a given traffic flow, no routing alteration will be possible. Otherwise, each routing choice will give rise to a fork in the traffic flow, and both paths of the fork will be assessed at step 707. If the traffic flow may be moved from the donor node to the donee node, its impact is assessed, still at step 707. The impact may be compared against a threshold to determine whether throughput, latency, or another performance measure will be degraded. In the case that an impact is determined to be small or positive, at step 708, a routing update may be generated and sent to the donor node. Otherwise, the next step of the routing path is traced at steps 709-706, until the path is fully traversed or a routing change is identified. Control then proceeds to the next traffic source, or once all traffic sources are handled at step 705, or if the route change threshold is reached, operation may return to the next congested interface at step 702, or the next congested node, at step 701. In some cases routes may be altered in different parts of the network without destabilizing the network.

Figure 8:
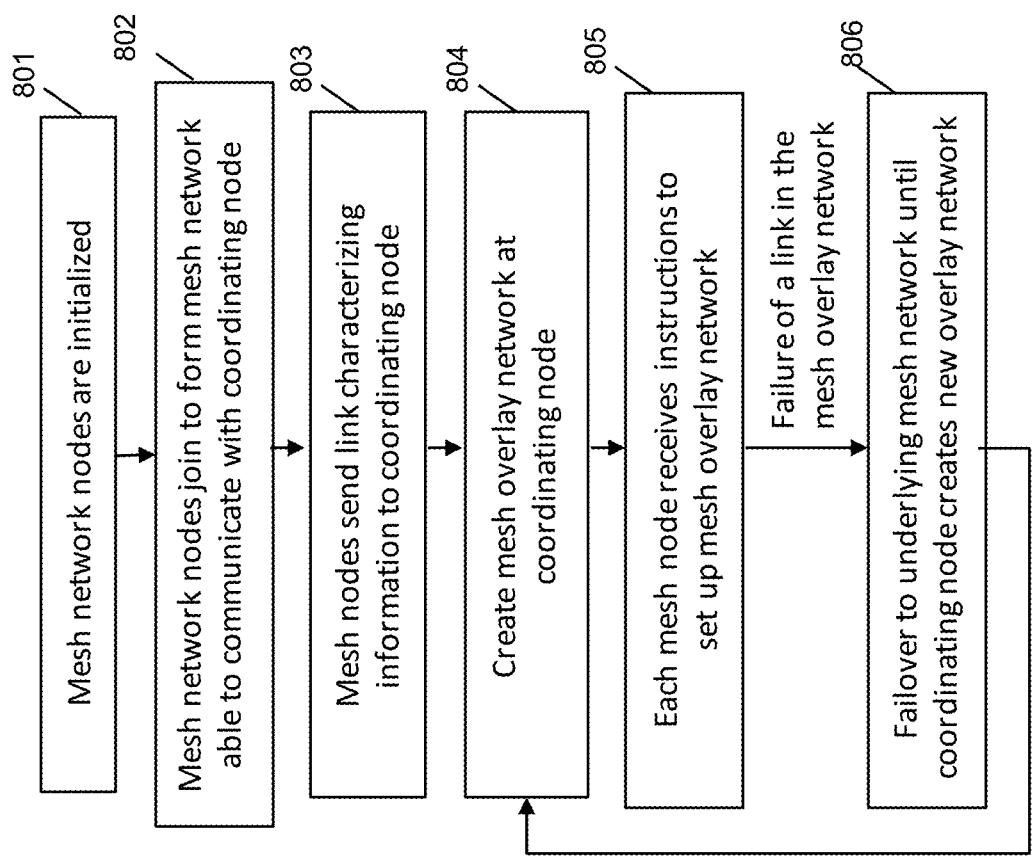
FIG. 8 is a flowchart of a failover method for a mesh network, in accordance with some embodiments.

FIG. 8 is a flowchart of a failover method for a mesh network, in accordance with some embodiments. At step 801, a mesh node is initialized. At step 802, the mesh network nodes may join to form a mesh network, able to communicate with a coordinating node or a routing node. At step 803, one or all mesh nodes may send link characterizing information to the coordinating node. At step 804, a mesh overlay network may be created at the coordinating node, as described herein and in relation to FIGS. 6-7. At step 805, instructions to create the mesh overlay network may be sent to each mesh node in the mesh network. At step 806, when a link in the mesh overlay network fails, it is prevented from negatively impacting the network as a whole by allowing the network to failover to the existing, underlying mesh network. A request to recreate the mesh overlay network is sent to the coordinating node and a new mesh overlay network is created at step 804.

Figure 9:
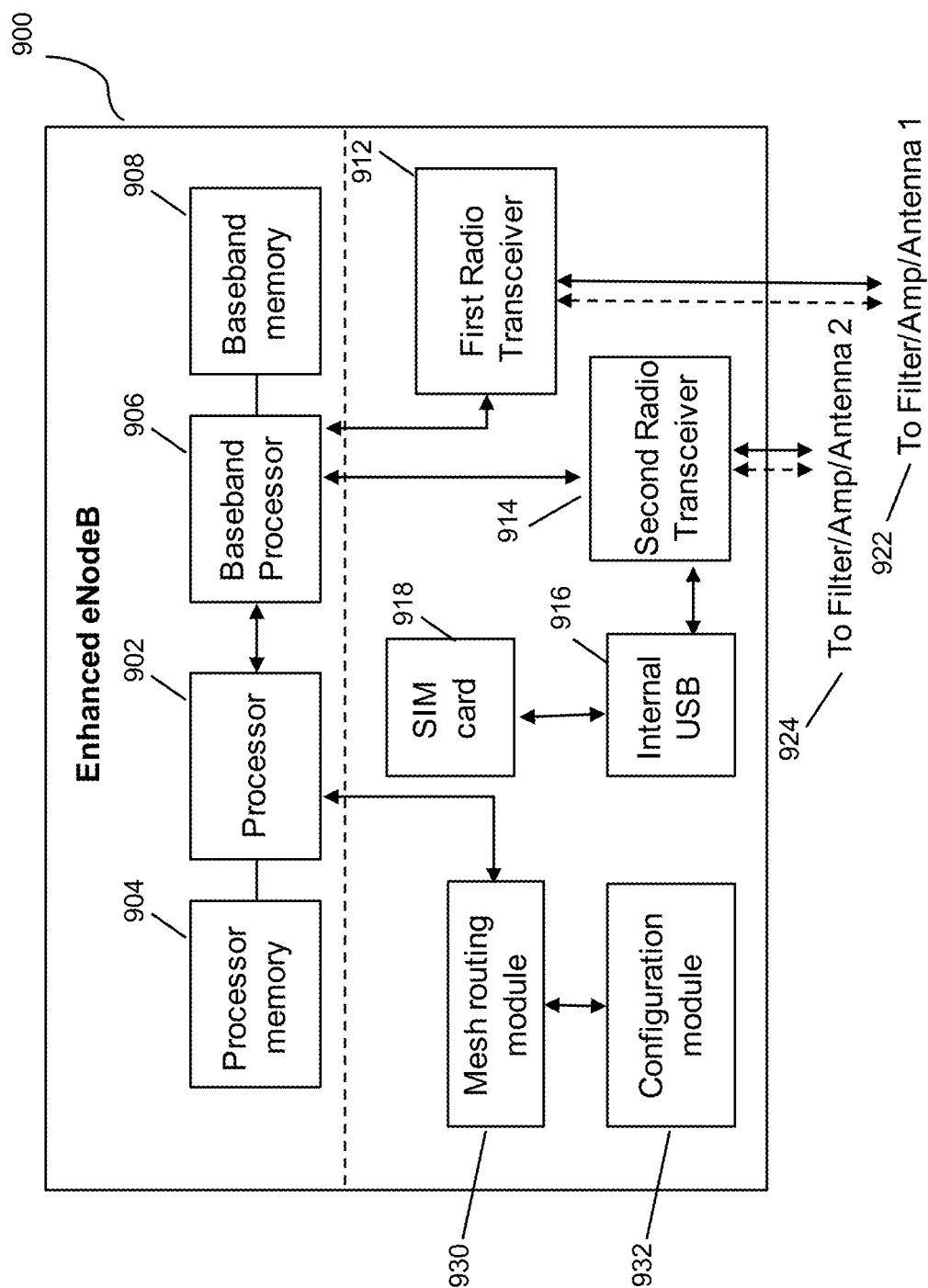
FIG. 9 is a schematic diagram of a mesh network node, in accordance with some embodiments.

FIG. 9 is a schematic diagram of a mesh network node, in accordance with some embodiments. Mesh network node 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916.

A mesh routing module 930 may also be included, and may be in communication with a configuration module 932, for handling routing tables, configuration messages from a cloud coordination server, and other configuration information. These modules may be software modules, processes, containers, or monolithic software processes. Configuration module 932 and mesh routing module 930 may each run on processor 902 or on another processor, or may be located within another device.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

Figure 10:
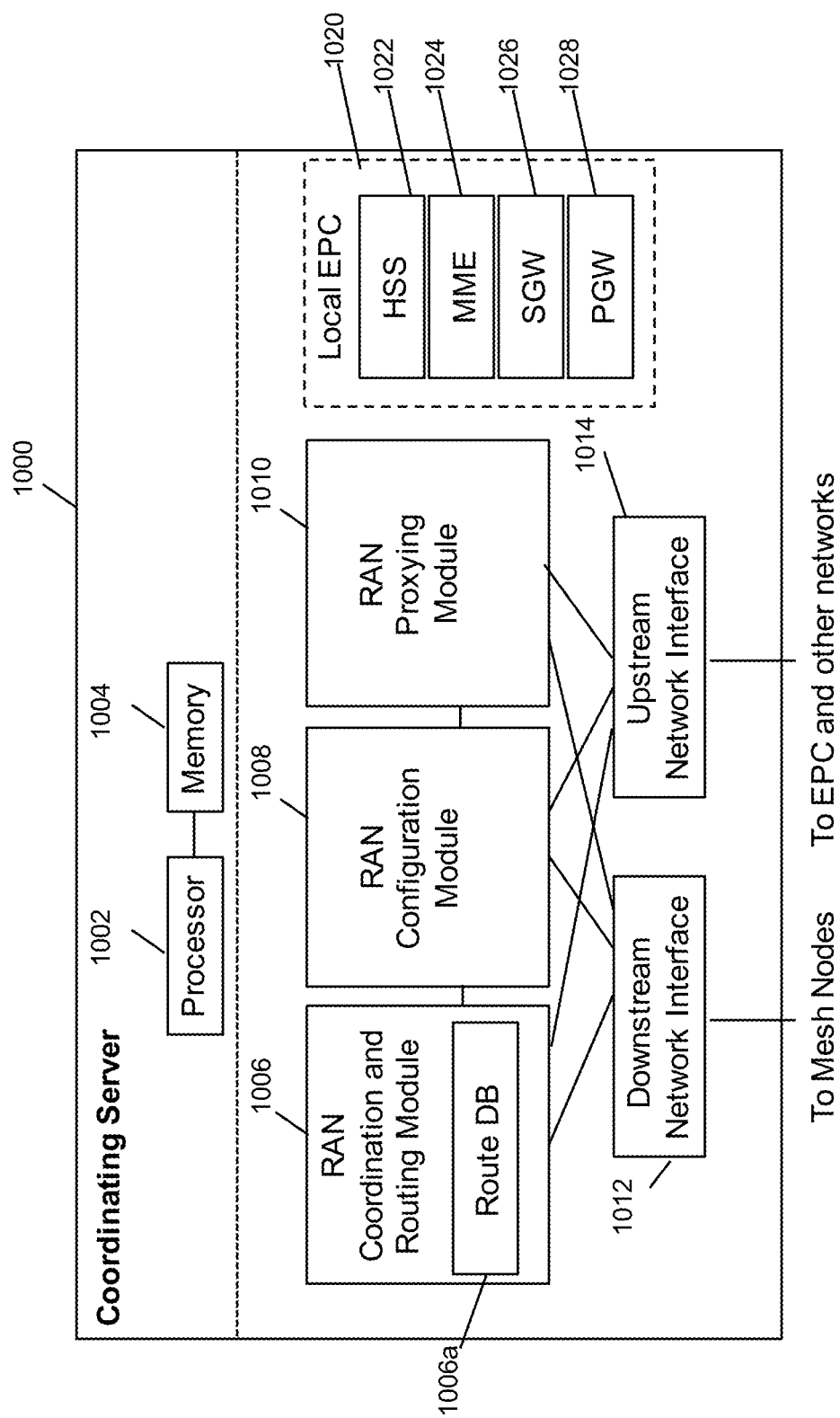
FIG. 10 is a schematic diagram of a routing coordination node, in accordance with some embodiments.

FIG. 10 is a schematic diagram of a routing coordination node, in accordance with some embodiments. Coordinator server 1000 includes processor 1002 and memory 1004, which are configured to provide the functions described herein. Also present are radio access network coordination/routing (RAN Coordination and routing) module 1006, including database 1006a, RAN configuration module 1008, and RAN proxying module 1010. In some embodiments, coordinator server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method, comprising:
   at an in-vehicle mobile mesh network node:
   sending link utilization statistics to a centralized routing node; and
   receiving, from the centralized routing node, a new route to move a particular traffic flow from a particular congested link to a particular non-congested link,
   wherein the new route is obtained at the centralized routing node based on an iteration over a set of congested links based on the link utilization statistics for a plurality of mesh network nodes, each congested link having at least one traffic flow that is active, each traffic flow having at least one traffic source and a path set comprising a set of nodes and links that is used by the traffic flow as packets travel from the at least one traffic source to one or more destinations;
   thereby providing a higher speed overlay route without computation of a link-aware metric or an expected transmission count using a mesh routing protocol at the mesh network node.

2. The method of claim 1 further comprising wherein the new route is further based on an identified set of non-congested links based on the link utilization statistics, each non-congested link sharing at least one traffic source with a traffic flow of a congested link in the set of congested links, to identify a potential donee node.

3. The method of claim 2 further comprising wherein the new route is further based on an iteration over each fork of a path fork in a path set between a source and a destination of the particular traffic flow associated with the particular congested link in the set of congested links.

4. The method of claim 3 further comprising wherein the new route is further based on a computation, for the iterated each fork, a new utilization level for the particular congested link that would result from moving the particular traffic flow from the particular congested link to the particular non-congested link in the set of non-congested links at the potential donee node.

5. The method of claim 1, further comprising computing, at the centralized routing node, a new utilization level for the particular non-congested link that would result from moving the particular traffic flow from the particular congested link to the particular non-congested link.

6. The method of claim 1, wherein the mesh network node has a base station (eNodeB) functionality and Wireless Fidelity (Wi-Fi) mesh networking functionality.

7. The method of claim 1, wherein the mesh network node is an in-vehicle mobile mesh network node.

8. The method of claim 1, further comprising utilizing the mesh network protocol for providing mesh network routes with lower priority than routes received from the centralized routing node.

9. The method of claim 1, wherein the mesh network protocol is the Babel protocol using an expected transmission count (ETX) metric.

10. The method of claim 1, wherein the mesh network node is configured to fail over to the lower priority mesh network routes when a link failure occurs on a route received from the centralized routing node.

11. The method of claim 1, further comprising receiving, at the mesh network node, default routes based on: a set of mesh nodes, a set of mesh node interfaces, a set of congested links, a set of non-congested links, or a set of path forks for a particular traffic flow path.

12. The method of claim 1, wherein the link utilization statistics include at least one of a channel clear count, an antenna cycle count, an inter-frame spacing, a packet count, a link modulation and coding scheme, and a measured link data rate.

13. The method of claim 1, further comprising identifying, at the centralized routing node, the set of congested links based on: a preconfigured traffic estimate; a network routing table connection tracking method; a packet count derived from a particular network interface on a mesh node; or statistics derived from an Internet Protocol Security (IPsec) module.

14. The method of claim 1, further comprising limiting a rate of route changes received at the mesh network node to within a maximum threshold rate, thereby reducing instability in a mesh network subsequent to sending the new route to the mesh network node.

15. The method of claim 1, further comprising falling back to the mesh routing protocol when a mesh network becomes unstable.

16. The method of claim 1, further comprising examining, at the centralized routing node, routes in the set of congested links for the mesh network node to determine route changes.

17. The method of claim 1, further comprising receiving, from the centralized routing node, a set of links for the mesh network node, wherein a change of load on any link of the set of links does not affect other links in the set of the links.

* * * * *